United States Patent
D et al.

(10) Patent No.: US 10,375,073 B2
(45) Date of Patent: Aug. 6, 2019

(54) CONFIGURATION BASED CLIENT FOR OAUTH AUTHORIZATION WITH ARBITRARY SERVICES AND APPLICATIONS

(71) Applicant: International Business Machines Corporation, Armonk, NY (US)

(72) Inventors: Manjunatha D, Bangalore (IN); Subramanian Krishnan, Mysore (IN); Harini Murugan, Madurai (IN)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 15/250,428

(22) Filed: Aug. 29, 2016

(65) Prior Publication Data

US 2018/0063140 A1    Mar. 1, 2018

(51) Int. Cl.
*H04L 29/06* (2006.01)
*G06F 21/41* (2013.01)
*H04L 29/08* (2006.01)

(52) U.S. Cl.
CPC .............. *H04L 63/10* (2013.01); *G06F 21/41* (2013.01); *H04L 67/02* (2013.01)

(58) Field of Classification Search
CPC .............................. G06F 21/41; H04L 63/0807
USPC .............................................................. 726/4
See application file for complete search history.

(56) References Cited

U.S. PATENT DOCUMENTS

| | | | |
|---|---|---|---|
| 8,613,055 B1 | 12/2013 | Tomilson et al. | |
| 8,745,718 B1* | 6/2014 | Dufel | H04L 63/0807 726/9 |
| 9,112,851 B2* | 8/2015 | de Oliveira | G06F 21/41 |
| 9,165,134 B2 | 10/2015 | Lorenzo et al. | |
| 9,306,922 B2 | 4/2016 | Herter et al. | |
| 9,467,457 B2* | 10/2016 | Si | H04L 63/102 |
| 2010/0269164 A1* | 10/2010 | Sosnosky | H04L 67/1095 726/7 |
| 2011/0099194 A1* | 4/2011 | Trevor | G06F 8/31 707/769 |
| 2012/0266229 A1* | 10/2012 | Simone | G06F 21/41 726/9 |
| 2014/0040993 A1* | 2/2014 | Lorenzo | G06F 21/41 726/4 |
| 2014/0297537 A1* | 10/2014 | Kassemi | G06Q 20/02 705/67 |
| 2016/0028737 A1 | 1/2016 | Srinivasan et al. | |

(Continued)

OTHER PUBLICATIONS https://auth0.com/docs/overview.

(Continued)

*Primary Examiner* — Bryan F Wright
(74) *Attorney, Agent, or Firm* — Patterson + Sheridan, LLP (57) ABSTRACT

Techniques for generic authentication with arbitrary services are provided. A request to authorize with a first service, of a plurality of services, using the OAuth protocol, is received by a generic client library, from a first application. A set of parameters specific to an implementation of the OAuth protocol provided by the first service are identified in a configuration file. An HTTP request is generated based on the set of parameters identified in the data structure, and the first application is authorized with the first service via the OAuth protocol using the generated HTTP request.

20 Claims, 5 Drawing Sheets

(56) References Cited

U.S. PATENT DOCUMENTS

2017/0223057 A1* 8/2017 Amiri ..................... H04L 63/20
2017/0324719 A1* 11/2017 Mason ................... H04L 63/08

OTHER PUBLICATIONS https://auth0.com/docs/api/v2#!/Connections/post_connections.
Atwood et al., OAuth Core 1.0, Dec. 4, 2007, 13 pages.
Hammer-Lahav, The OAuth 1.0 Protocol, IETF, Apr. 2010, 38 pages.

* cited by examiner

CONFIGURATION BASED CLIENT FOR OAUTH AUTHORIZATION WITH ARBITRARY SERVICES AND APPLICATIONS

BACKGROUND

The present invention relates to computer software, and more specifically, to computer software which provides a configuration-based client for OAuth authorization with arbitrary services and applications.

OAuth is an open standard for authorization. Services (also referred to as applications) may use OAuth as a mechanism to authorize third party applications to access resources in the service on behalf of clients (e.g., users) without sharing a user's login credentials. For example, a service which allows users to create digital photo albums may use OAuth to access a user's digital images stored by an image hosting service without requiring the user to provide their login credentials with the image hosting service.

Developing an application which needs access to resources provided by other services entails configuring the application to implement the steps of the OAuth protocol to obtain tokens that can be used to perform other operations on the services. However, each service may provide a specific implementation of the OAuth protocol, which may include different parameters, HTTP methods, and the like. When an application needs to support multiple different services, the application must include the service-specific code required to interface with each service's OAuth implementation. As such, applications can become bloated with service-specific code that is difficult to maintain. Furthermore, adding new services to the application means the application code has to be built and re-deployed, leading to application downtime.

SUMMARY

In one embodiment, a method comprises receiving, from a first application by a second application, a request to authorize with a first service, of a plurality of services, using the OAuth protocol, identifying, in a data structure by the second application, a set of parameters specific to an implementation of the OAuth protocol provided by the first service, modifying, by the second application, a first parameter of the second application based on the set of parameters identified in the data structure, and authorizing, by the second application, the first application with the first service via the OAuth protocol using the modified first parameter.

In another embodiment, a system comprises a processor and a memory storing instructions, which when executed by the processor, performs an operation comprising receiving, from a first application by a second application, a request to authorize with a first service, of a plurality of services, using the OAuth protocol, identifying, in a data structure by the second application, a set of parameters specific to an implementation of the OAuth protocol provided by the first service, modifying, by the second application, a first parameter of the second application based on the set of parameters identified in the data structure, and authorizing, by the second application, the first application with the first service via the OAuth protocol using the modified first parameter.

In another embodiment, a computer-readable storage medium has computer-readable program code embodied therewith, the computer-readable program code executable by a processor to perform an operation comprising receiving, from a first application by a second application, a request to authorize with a first service, of a plurality of services, using the OAuth protocol, identifying, in a data structure by the second application, a set of parameters specific to an implementation of the OAuth protocol provided by the first service, modifying, by the second application, a first parameter of the second application based on the set of parameters identified in the data structure, and authorizing, by the second application, the first application with the first service via the OAuth protocol using the modified first parameter.

DETAILED DESCRIPTION

Embodiments disclosed herein allow applications to perform OAuth authorization with arbitrary services by abstracting the service-specific details from the applications seeking to access the services. Generally, applications (also referred to as services) may be configured to interface with a single generic client library. The generic client library in turn interfaces with a data store that includes service-specific OAuth configuration information for each of a plurality of services. The generic client library may use the service-specific configuration information to make the hypertext transfer protocol (HTTP) calls required to complete the steps of the OAuth protocol. Once the steps of the OAuth protocol are complete, the application may use the resulting tokens to access resources provided by the services.

Figure 1:
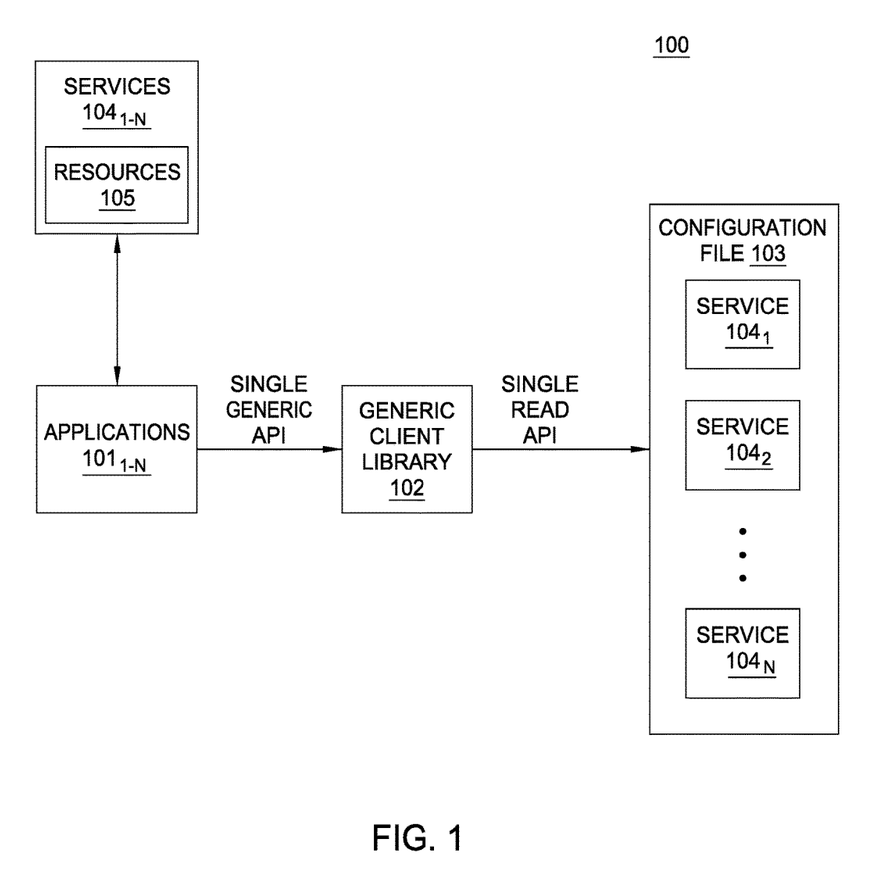
FIG. 1 illustrates a system architecture which provides a configuration based client for OAuth authorization with arbitrary services and applications, according to one embodiment.

FIG. 1 illustrates a system architecture 100 which provides a configuration based client for OAuth authorization with arbitrary services and applications, according to one embodiment. As shown, the system 100 includes a plurality of applications $101_{1-N}$, a generic client library 102, a configuration file 103, and a plurality of services $104_{1-N}$. The applications $101_{1-N}$ are representative of any type of computing application. The services $104_{1-N}$ are representative of any type of computing service that implements the OAuth authorization protocol to grant access to resources 105 provided by the services $104_{1-N}$. The resources 105 are representative of any type of computing resource, such as user account information, images, videos, storage, services, and the like. For example, a service $104_1$ may be an email service, and the resources 105 for the service $104_1$ include emails, calendar data, and other information related to the email accounts of a plurality of different users. In such an example, an application $101_1$ may be a third-party email application that allows users to access email accounts provided by the email service $104_1$. Before accessing the emails and other resources 105 provided by the email service $104_1$, the application $101_1$ needs to be authorized with the service $104_1$ using the OAuth protocol. Doing so allows the application $101_1$ to access the account specific resources 105 provided by the email service $104_1$ without requiring the user to enter their credentials with the email service $104_1$ (e.g., a login and password).

However, each service $104_{1-N}$ may implement the OAuth protocol in different ways. For example, service $104_1$ may require the applications $101_{1-N}$ to provide information using the HTTP GET method, while service $104_2$ may require the applications $101_{1-N}$ to provide information using the HTTP POST method. Similarly, parameters names used by the services $104_{1-N}$ may differ. Therefore, the applications $101_{1-N}$ cannot simply re-use code that was generated for the implementation of the OAuth protocol on service $104_1$ with the implementation of the OAuth protocol on service $104_2$.

Advantageously, however, the applications $101_{1-N}$ interface with the generic client library 102, which in turn interfaces with the configuration file 103. As shown, the configuration file 103 is a data store which includes OAuth configuration information for the services $104_{1-N}$. Generally, the configuration file 103 captures detailed information about each step of the OAuth protocol for each service $104_{1-N}$. For example, the configuration file 103 may store, for each service $104_{1-N}$, uniform resource locators (URLs), methods, input parameters, output parameters, validation information, and binding information which specifies how parameters will be bound to a value at runtime (e.g., the environment, config, hard-coded, local variable, and global variable binding options). Although depicted as a single file, in at least one embodiment, multiple configuration files 103 may be used, where each configuration file 103 stores the OAuth configuration information for one of the services $104_{1-N}$. In at least one embodiment, the information stored in the configuration files 103 are passed as input to the generic client library 102.

Multiple versions of the OAuth protocol exist, and therefore, the configuration file 103 may include information for each version of the OAuth protocol implemented by the services $104_{1-N}$. For example, the configuration file 103 may include a template for version 1.0 of the OAuth protocol. The template for version 1.0 of the OAuth protocol may include a configuration section, a series of steps of version 1.0 of the OAuth protocol, parameter binding options, and validations. The configuration section may specify the client_id, client_secret, and redirect_uri parameters of version 1.0 of the OAuth protocol. The steps of version 1.0 of the OAuth protocol include a request step which requests a temporary token (e.g., getTmpToken), an authorizing step (e.g., authorize), a callback step (e.g., callback), and a step in which the requesting application $101_N$ receives an access token from the services $104_{1-N}$ (e.g., getToken). For each step in version 1.0 of the OAuth protocol, the configuration file 103 may specify configuration parameters for the URL (e.g., a formatting or specific URL), method (e.g., GET or POST), input parameters for each step, and output parameters for each step. The parameter binding options in the configuration file 103 specify how parameters are bound to variables (e.g., environment, global variable, local variable, config, and/or hard coded variables). The validation configuration information in the configuration file 103 includes information used to validate data flowing in and/or out of each step of the OAuth protocol (e.g., the oauth_callback_confirmed value should be true after the request token step).

The configuration file 103 may also include a template for version 2.0 of the OAuth protocol. The template for version 2.0 of the OAuth protocol may include a configuration section, the steps of version 2.0 of the OAuth protocol, parameter binding options, and validations. The configuration section may specify the client_id, client_secret, redirect_uri, and grant type (e.g., AUTH_CODE or RESOURCE_OWNER_PASSWORD_CREDENTIALS) parameters of version 2.0 of the OAuth protocol. The steps of version 2.0 of the OAuth protocol include an authorizing step (e.g., authorize), a callback step (e.g., callback), and a step in which the requesting application receives an access token from the services $104_{1-N}$ (e.g., getToken). For each step in version 2.0 of the OAuth protocol, the configuration file 103 may specify configuration parameters for the URL (e.g., a formatting or specific URL), method (e.g., GET or POST), input parameters for each step, and output parameters for each step. The parameter binding options in the configuration file 103 specify how parameters are bound to variables (e.g., environment, global variable, local variable, config, and/or hard coded variables). The validation configuration information in the configuration file 103 includes information used to validate data flowing in and/or out of each step of the OAuth protocol (e.g., the state specified in the authorize step should match the state returned in the callback step).

The generic client library 102 leverages the information stored in the configuration file 103 to perform the steps of the OAuth protocol with each service $104_{1-N}$ while abstracting the service-specific implementation details from the applications $101_{1-N}$. For example, the generic client library 102 may use the information stored in the configuration file 103 to make the HTTP calls required by the OAuth protocol. The generic client library 102 may also use the parameter binding options to transfer values between each step of the OAuth protocol. For example, in version 2.0 of the OAuth protocol, the steps include authorize (an outbound HTTP call), callback (inbound), and getToken (outbound). As such, the generic client library 102 may include an authorize function, a callback function, and a resolve function. The authorize function is invoked by the applications $101_{1-N}$ to begin the OAuth authorization process with one of the services $104_{1-N}$. Continuing with a previous example, the third party email application $101_1$ may invoke the generic client library 102 to perform OAuth authentication with the email service $104_1$. Based on the service name and corresponding configuration received from the configuration file 103, the authorize function of the generic client library 102 may perform the authorize step of version 2.0 of the OAuth protocol by binding the parameters as necessary. However, if the RESOURCE_OWNER_PASSWORD_CREDENTIALS parameter is set, the authorize function is not invoked. In such an embodiment, the generic client library 102 captures the configuration information from the configuration file 103 necessary to construct a dynamic page where a user can input login credentials, and seek authorization using the provided credentials.

The generic client library 102 may then invoke the callback function after the authorization step completes. Once invoked, the callback function performs state validation according to the configuration file 103. Based on the parameters for each service $104_{1-N}$ in the configuration file 103, the callback function creates a form object (if the authorization step was successful) or an error object (if the authorization step failed). If authorization was successful, the callback function creates a token object according to the configuration file 103, and returns the token object. If authorization was not successful, the callback function constructs the error object according to the configuration file 103 and returns the error object. The resolve function binds the values of parameters based on the binding option specified in the configuration file 103 for each service 104$_{1-N}$.

As new services 104$_N$ become available (and/or begin supporting the OAuth protocol), users may update the configuration file 103 with the service-specific implementation details that allow the applications 101$_{1-N}$ to access these services without having to be re-coded to support the service-specific implementation details of each service 104$_N$. Table I reflects an example of the configuration information in the configuration file 103 for an example service, "Service A", which includes information for the three steps of version 2.0 of the OAuth protocol as implemented by example Service A:

TABLE I

```
{
"Service A": {
  "config": {
    "client_id": "30pkegzod4jy2z67jzdrvd5nicw6w4cz",
    "client_secret": "3D2ICKwQ2i2qZYv3cbWW1hQCJn0jNYCO",
    "type": "AUTH_CODE",
    "redirect_uri": "http://localhost:7890/oauth2/redirect/serviceA"
  },
  "steps": [{
    "name": "auth",
    "seqnum": 1,
    "url": "https://example.com/api/oauth2/authorize",
    "method": "GET",
    "input_params": [{
      "name": "response_type",
      "value": "code",
      "type": "query"
    }, {
      "name": "client_id",
      "value": "$$config.client_id",
      "type": "query"
    }, {
      "name": "redirect_uri",
      "value": "$$config.redirect_uri",
      "type": "query"
    }, {
      "name": "state",
      "value": "$$serviceA.state",
      "type": "query"
    }]
  }, {
    "name": "callback",
    "seqnum": 2,
    "url": "$$config.redirect_uri",
    "method": "GET",
    "validate": {
      "key": "$$serviceA.state",
      "value": "$$var.req.query.state"
    },
    "form_object": [{
      "name": "grant_type",
      "value": "authorization_code"
    }, {
      "name": "client_id",
      "value": "$$config.client_id"
    }, {
      "name": "client_secret",
```

TABLE I-continued

```
      "value": "$$config.client_secret"
    }, {
      "name": "code",
      "value": "$$var.req.query.code"
    }],
    "error_object": [{
      "name": "error",
      "value": "$$var.req.query.error"
    }, {
      "name": "error_description",
      "value": "$$var.req.query.error_description"
    }]
  }, {
    "name": "token",
    "seqnum": 3,
    "url": "https://example.com/api/oauth2/token",
    "method": "POST",
    "input_params": [{
      "name": "Accept",
      "value": "application/json",
      "type": "header"
    }, {
      "name": "Content-Type",
      "value": "application/x-www-form-urlencoded",
      "type": "header"
    }, {
      "name": "body",
      "value": "$$var.form_object",
      "type": "body"
    }],
    "output_params": [{
      "name": "access_token",
      "value": "$$var.body.access_token",
      "type": "body",
      "statusCode": 200,
      "success": true
    }, {
      "name": "refresh_token",
      "value": "$$var.body.refresh_token",
      "type": "body",
      "statusCode": 200,
      "success": true
    }, {
      "name": "error",
      "value": "$$var.body.error",
      "type": "body",
      "statusCode": 200
    }, {
      "name": "error_description",
      "value": "$$var.body.error_description",
      "type": "body",
      "statusCode": 200
    }]
  }]
}
}
```

The configuration file 103 may have configuration information similar to that depicted in Table I for each of the services 104$_{1-N}$, where values specific to each service 104$_N$ are specified in the configuration file 103. Furthermore, the configuration file 103 may include configuration information for multiple versions of the OAuth protocol implemented by the services 104$_{1-N}$ (e.g., with information regarding each step of each version of the OAuth protocol).

Table II below reflects example code used to implement the generic client library 102 in one embodiment. As shown, Table II reflects code that includes a resolve function, an authorize function, and a callback function, corresponding to version 2.0 of the OAuth protocol:

TABLE II

```
'use strict';
var request = require('request');
var state = { };
function _resolve(key, config, vars) {
```

TABLE II-continued

```
function _bind(key, inpvar) {
    var out = inpvar;
    var tokens = key.split(".");
    for (var i = 0; i < tokens.length; ++i) {
        var t = tokens[i];
        out = out[t];
    }
    return out;
}
if (key.match(/^\$\$config/)) {
    var resolved_key = key.substring(9);
    //console.log(":::"+resolved_key);
    return config[resolved_key];
}
if (key.match(/^\$\$env/)) {
    return process.env[key];
}
if (key.match(/^\$\$var/)) {
    var resolved_key = key.substring(6);
    //console.log(":::"+resolved_key);
    return_bind(resolved_key, vars);
}
if (key.match(/^\$\$/)) {
    var resolved_key = key.substring(2);
    //console.log(":::"+resolved_key);
    return _bind(resolved_key, state);
    }
    return key;
}
function authorize(app_name, app_config, res) {
    console.log("authorize called for " + app_name);
    console.log(JSON.stringify(app_config));
    var grant_type = app_config.config.type;
    var url;
    if (grant_type === 'AUTH_CODE') {
    url = app_config.steps[0].url;
    var input_params = app_config.steps[0].input_params;
    var delim = '?';
    for (var i = 0; i < input_params.length; ++i) {
        var inp = input_params[i];
        if (inp.type === 'query') {
            url += delim + inp.name + '=';
            url += _resolve(inp.value, app_config.config);
            delim = '&';
        }
    }
}
    console.log(url);
    res.statusCode = 302;
    res.setHeader("Location", url);
    res.end( );
}
function callback(app_name, app_config, req, res) {
    console.log("callback called for " + app_name);
    console.log(JSON.stringify(req.query));
    var grant_type = app_config.config.type;
    var vars = {
    'req': req,
    'res': res
};
    var form = '';
    var error;
    var validate = app_config.steps[1].validate;
    if (validate) {
        var key = _resolve(validate.key, app_config.config, vars);
        var value = _resolve(validate.value, app_config.config, vars);
        console.log("::" + key + "::" + value);
        if (key !== value) {
            error = {
                error_description: 'INVALID STATE'
            }
        };
    }
    var folist = app_config.steps[1].form_object;
    var eolist = app_config.steps[1].error_object;
    var delim = '';
    for (var i = 0; i < folist.length; ++i) {
        var fo = folist[i];
        form += delim + fo.name + '=';
        form += _resolve(fo.value, app_config.config, vars);
```

TABLE II-continued

```
            delim = '&';
        }
        console.log("::" + form);
        for (var i = 0; i < eolist.length; ++i) {
            var eo = eolist[i];
            if (!error) error = { };
            error[eo.name] = _resolve(eo.value, app_config.config, vars);
        }
        //console.log(JSON.stringify(error));
        if (!error || JSON.stringify(error) === '{ }') {
            console.log("reached here....");
            var reqobj = {
                url: app_config.steps[2].url,
                method: app_config.steps[2].method
            };
            var headers = { };
            var inlist = app_config.steps[2].input_params;
            for (var i = 0; i < inlist.length; ++i) {
                var io = inlist[i];
                if (io.type === 'body') reqobj.body = form;
                if (io.type === 'header') headers[io.name] = io.value;
            }
            if (JSON.stringify(headers) !== '{ }') reqobj.headers = headers;
            request(reqobj, function(error, response, body) {
                if (error) {
                    console.log(error); //call error page
                    res.error(error);
                }
                else {
                    var outlist = app_config.steps[2].output_params;
                    var output = { };
                    var error2 = { };
                    var vars2 = {
                        'body': JSON.parse(body)
                    };
                    for (var i = 0; i < outlist.length; ++i) {
                        var oo = outlist[i];
                        //console.log(JSON.stringify(oo));
                        if (oo.statusCode === response.statusCode) {
                            if (oo.success) output[oo.name] = _resolve(oo.value,
app_config.config, vars2);
                            else error2[oo.name] = _resolve(oo.value, app_config.config,
vars2);
                        }
                    }
                    //console.log(JSON.stringify(output));
                    if (JSON.stringify(error2) !== '{ }') res.json(error2);
                    else res.json(output);
                }
            });
        }
    }
    module.exports.authorize = authorize;
    module.exports.callback = callback;
    module.exports.state = state;
```

Table III illustrates an example of source code in one of the applications $101_N$ which interfaces with the generic client library 102 to use OAuth version 2.0 to authenticate with three example services, namely ServiceA, ServiceB, and ServiceC:

TABLE III

```
var express = require('express');
var bodyParser = require('body-parser');
var _ = require('underscore');
var https = require('https');
var request = require('request');
var config = require('./oauth2_config.json'); //read from cloudant ultimately
var oauth2 = require('./generic_oauth2.js');
//for each app init state - will be done in a generic for loop ultimately
oauth2.state.ServiceA = {'state': 'axRSj328!1'};
oauth2.state.ServiceB = {'state': '9ijdefng3@'};
oauth2.state.ServiceC = {'state': 'h45fru(=k'};
var http_host = (process.env.VCAP_APP_HOST || '0.0.0.0');
var http_port = (process.env.VCAP_APP_PORT || 7890);
```

TABLE III-continued

```
        var app = express( );
        app.set('port', http_port);
        app.set('host', http_host);
        app.use(express.static(__dirname + '/public'));
        app.use(bodyParser.json( ));
        var server = app.listen(app.get('port'), app.get('host'), function( ) {
            console.log('Express server listening on ' + server.address( ).address + ':' +
server.address( ).port);
        });
        app.get('/oauth2/authorize/:app_name', function(req, res) {
            var app_name = req.params.app_name;
            console.log("Authorize called for " + app_name);
            oauth2.authorize(app_name, config[app_name], res);
        });
        app.get('/oauth2/redirect/:app_name', function(req, res) {
            var app_name = req.params.app_name;
            console.log("Callback called for " + app_name);
            oauth2.callback(app_name, config[app_name], req, res);
        });
```

Figure 2:
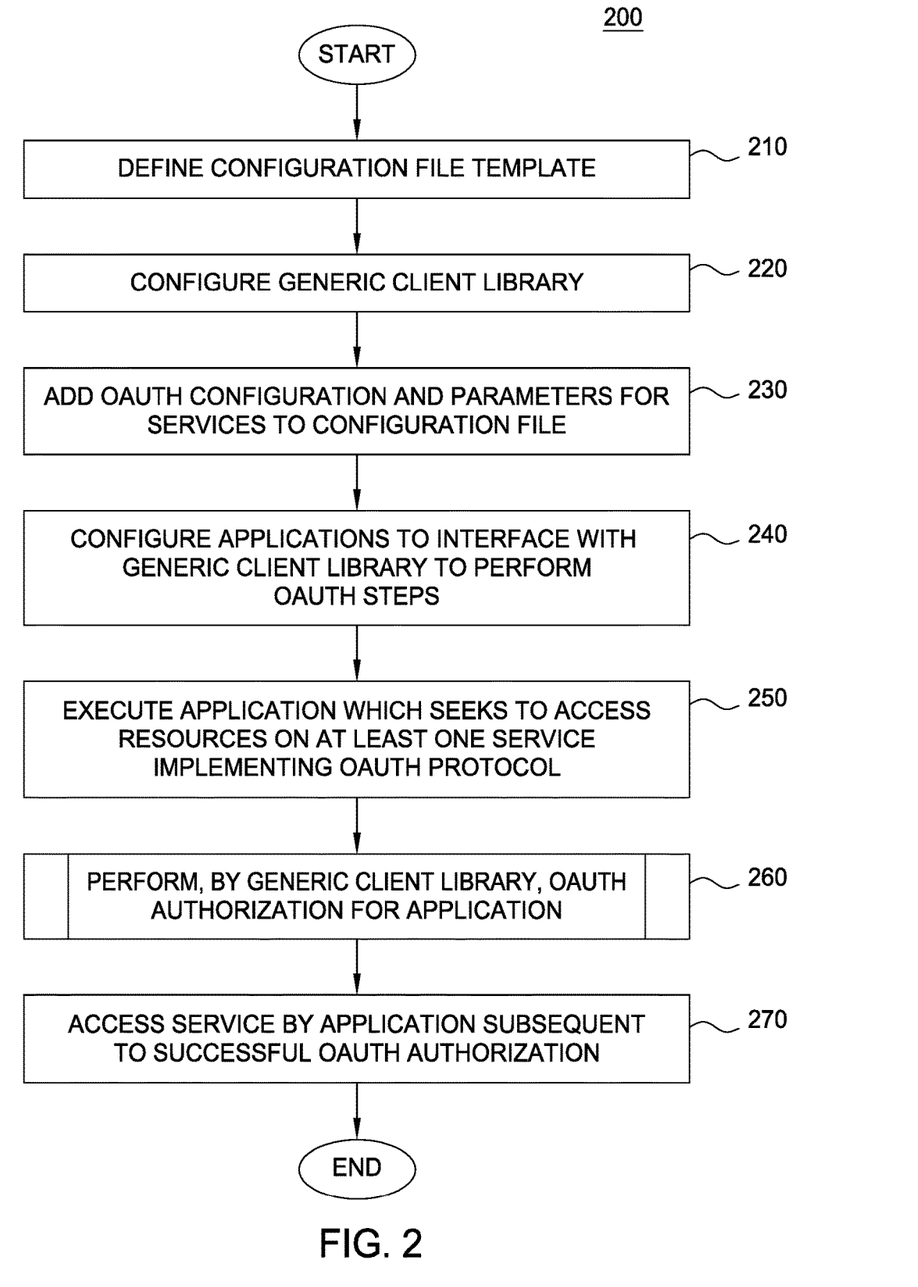
FIG. 2 illustrates an example method to provide a configuration based client for OAuth authorization with arbitrary services and applications, according to one embodiment.

FIG. 2 illustrates an example method 200 to provide a configuration based client for OAuth authorization with arbitrary services and applications, according to one embodiment. As shown, the method 200 begins at block 210, where a user may define the templates for the configuration file 103. As previously indicated, the templates may be for each version of the OAuth protocol. The templates may specify the configuration parameters, the steps of the OAuth protocol (and associated configuration information), how parameters are bound at runtime, and whether any validations need to be performed at each step of the OAuth process. At block 220, the generic client library 102 is configured to perform each step of the OAuth protocol according to the configuration information for each service $104_{1-N}$ stored in the configuration file 103. Table II above depicts one example of source code for the generic client library 102.

At block 230, a user may add OAuth configuration and parameters for the services $104_{1-N}$ to the configuration file 103. Table I above depicts an example of a configuration file 103 for a generic service $104_N$. At block 240, the applications $101_{1-N}$ are configured to interface with the generic client library 102 to perform the steps of the OAuth authorization protocol. Table III above depicts one example of source code that may be included in the applications $101_{1-N}$ that allows the applications $101_{1-N}$ to interface with the generic client library 102.

At block 250, one or more of the applications $101_{1-N}$ may be executed. The executing applications $101_{1-N}$ may seek access to the resources 105 of one or more services $104_{1-N}$ that implement the OAuth protocol. In response, the applications $101_{1-N}$ may invoke the generic client library 102 to perform the steps of the OAuth protocol. In at least one embodiment, the generic client library 102 provides a read application programming interface (API) that the applications $101_{1-N}$ may use to read data from the generic client library 102 and invoke the generic client library 102. In at least one embodiment, the applications $101_{1-N}$ may provide an identifier of the target service $104_N$ to the generic client library 102, allowing the generic client library 102 to identify information for the target service $104_N$ in the configuration file 103. At block 260, the generic client library 102 performs the OAuth authorization on behalf of the requesting application $101_{1-N}$. As previously indicated, the generic client library 102 uses the information stored in the configuration file 103 to abstract the service-specific implementation details required to authorize the applications $101_{1-N}$ with the services $104_{1-N}$. At block 270, the applications $101_{1-N}$ may access the resources 105 provided by the services $104_{1-N}$ subsequent to a successful OAuth authorization. If, however, the OAuth authorization fails, the applications $101_{1-N}$ are not permitted to access the resources 105 of the services $104_{1-N}$.

Figure 3:
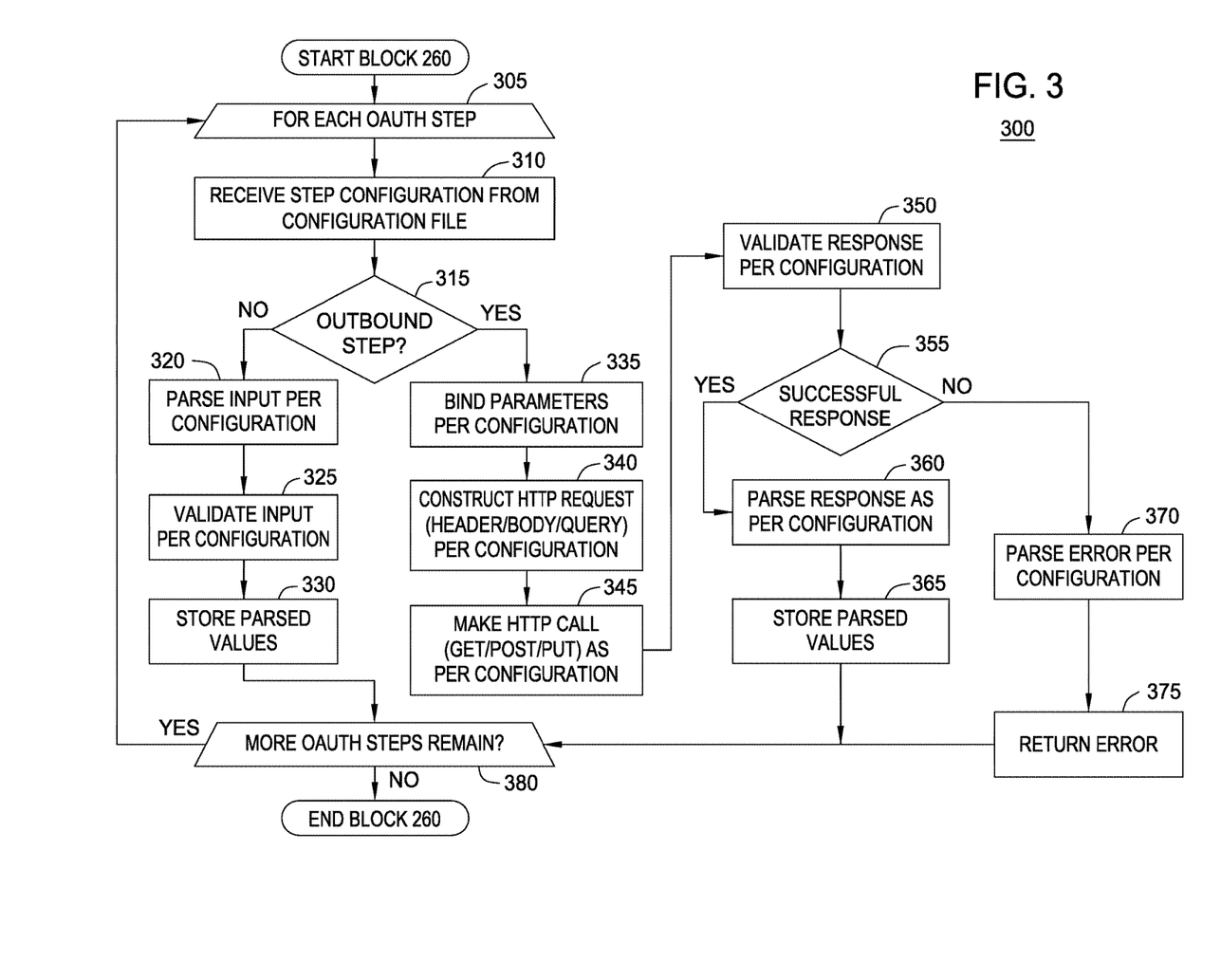
FIG. 3 is a flow chart illustrating an example method to perform OAuth authorization using a generic client library, according to one embodiment.

FIG. 3 is a flow chart illustrating an example method 300 corresponding to block 260 to perform OAuth authorization using the generic client library 102, according to one embodiment. The example depicted in FIG. 3 corresponds to version 2.0 of the OAuth protocol. As shown, the method 300 begins at block 305, where the generic client library 102 executes a loop including blocks 310-380 for each step in version 2.0 of the OAuth protocol (e.g., the authorize, callback, and getToken steps). At block 315, the generic client library 102 receives the configuration information for the current step from the configuration file 103. In at least one embodiment, the generic client library 102 reads the information from the configuration file 103 via a read API provided by the configuration file 103. In the example configuration information depicted in Table I, the configuration information for the authorization step of the OAuth protocol includes a URL, method, and input parameters. The URL specifies where the generic client library 102 should direct an HTTP call, while the method indicates which HTTP method should be used in composing the HTTP call (in this example, the HTTP GET method). The names of the input parameters include a response_type, client_id, redirect_uri, and state, while each of these input parameters are query parameters. The generic client library 102 may use these input parameter names to construct an HTTP call as part of the authorization step. As shown in Table I, the input parameter response_type is hard-coded (e.g., static) variable with a value of "code", while input parameters client_id, redirect_uri, and state are dynamically determined by the generic client library 102 at runtime.

At block 315, the generic client library 102 determines whether the current step is an outbound step (e.g., a step where information is sent to the service $104_N$, rather than an inbound step where information is received from the service $104_N$). In at least one embodiment, the configuration file 103 includes metadata describing whether the current step is inbound or outbound. If the current step is not an outbound step (e.g., is an inbound step), the service $104_N$ has provided information to the generic client library 102, which then proceeds to block 320. At block 320, the generic client library 102 parses the input received from the service $104_N$ as part of the current step of the OAuth protocol per the configuration information for the current step. Doing so allows the generic client library 102 to convert the information received from the service 104$_N$ into a format understood by the generic client library 102 and/or the application 101$_N$. At block 325, the generic client library 102 validates the input received from the service 104$_N$ per the parameters stored in the configuration file 103 for the corresponding service 104$_N$. At block 330, the generic client library 102 stores the parsed values for future use. The generic client library 102 may then proceed to block 380.

Returning to block 315, if the current step is an outbound step, the generic client library 102 proceeds to block 335. At block 335, the generic client library 102 binds the parameters of the current step of the OAuth protocol per the configuration information in the configuration file 103 for the current step of the OAuth protocol as implemented by the service 104$_N$. At block 340, the generic client library 102 constructs an HTTP request which includes header, body, and query portions per the information for the current step of the OAuth protocol implemented by the service 104$_N$ in the configuration file 103. At block 345, the generic client library 102 makes the HTTP call according to a format (e.g., HTTP GET, HTTP POST, or HTTP PUT) specified in the configuration file 103 for the service 104$_N$. At block 350, the generic client library 102 may validate a response received from the service 104$_N$ responsive to the HTTP call. The generic client library 102 validates the response based on rules for validating the response for the service 104$_N$ stored in the configuration file 103. Generally, the recipient of an HTTP request (e.g., the HTTP call issued at block 345) may respond with an HTTP response. Therefore, the service 104$_N$ may respond to the HTTP call of block 345 with any valid HTTP response (e.g., 200 success, 500 failure, etc.). As such, the configuration file 103 may include information on how to parse each HTTP response received from each service 104$_N$. For example, as shown in Table I, the validation for ServiceA is based on a specified key/value pair that are returned by service A. Furthermore, the validation at block 350 may be optional depending on the OAuth implementation of each service 104$_N$. Therefore the generic client library 102 may skip the validation if the configuration file 103 indicates that the service 104$_N$ does not implement validation.

At block 355, the generic client library 102 determines whether the validated response indicates the response was successful. The generic client library 102 may include code which implements rules for validating responses. For example, as shown in Table II, the generic client library 102 applies the rules to the key/value pairs identified in the configuration information for ServiceA above. If the response was successful, the generic client library 102 proceeds to block 360, where the generic client library 102 parses values provided by the service 104$_N$ in the HTTP response per the information corresponding to the response for the service 104$_N$ in the configuration file 103. At block 365, the generic client library 102 stores the values parsed at block 360 for future use. The generic client library 102 may then proceed to block 380.

Returning to block 355, if the response was not successful (e.g., the service 104$_N$ returns an indication of an error), the generic client library 102 proceeds to block 370. At block 370, the generic client library 102 parses the error based on rules for parsing the error stored in the configuration file 103 for the service 104$_N$. At block 375, the generic client library 102 returns an indication of an error.

At block 380, the generic client library 102 determines whether more steps of the OAuth protocol remain. If more steps remain, the generic client library 102 returns to block 305 to continue the steps of the OAuth protocol. If no more steps remain, the OAuth authorization process has completed (or was terminated based on an error), and the method 300 ends.

Figure 4:
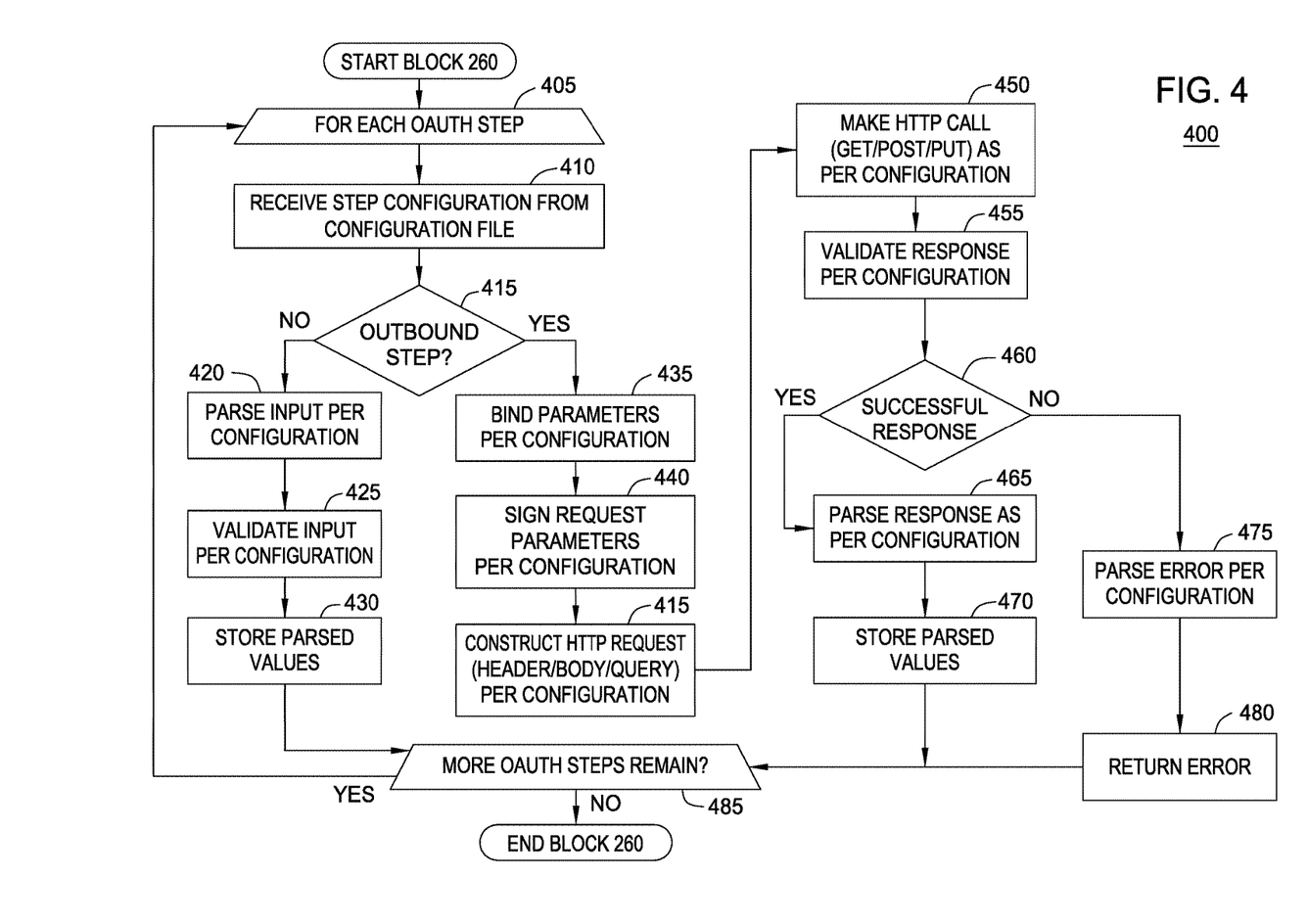
FIG. 4 is a flow chart illustrating an example method to perform OAuth authorization using a generic client library, according to one embodiment.

FIG. 4 is a flow chart illustrating an example method 400 corresponding to block 260 to perform OAuth authorization using a generic client library, according to one embodiment. The example depicted in FIG. 4 corresponds to version 1.0 of the OAuth protocol. As shown, the method 400 begins at block 405, where the generic client library 102 executes a loop including blocks 410-485 for each step in version 1.0 of the OAuth protocol (e.g., the getTmpToken, authorize, callback, and getToken steps). At block 415, the generic client library 102 receives the configuration information for the current step from the configuration file 103. In at least one embodiment, the generic client library 102 reads the information from the configuration file 103 via a read API provided by the configuration file 103.

At block 415, the generic client library 102 determines whether the current step is an outbound step (e.g., a step where information is sent to the service 104$_N$, rather than an inbound step where information is received from the service 104$_N$). In at least one embodiment, the configuration file 103 includes metadata describing whether the current step is inbound or outbound. If the current step is not an outbound step (e.g., is an inbound step), the service 104$_N$ has provided information to the generic client library 102, which then proceeds to block 420. At block 420, the generic client library 102 parses the input received from the service 104$_N$ as part of the current step of the OAuth protocol per the configuration information for the current step. Doing so allows the generic client library 102 to convert the information received from the service 104$_N$ into a format understood by the generic client library 102 and/or the application 101$_N$. At block 425, the generic client library 102 validates the input received from the service 104$_N$ per the parameters stored in the configuration file 103 for the corresponding service 104$_N$. At block 430, the generic client library 102 stores the parsed values for future use. The generic client library 102 may then proceed to block 485.

Returning to block 415, if the current step is an outbound step, the generic client library 102 proceeds to block 435. At block 435, the generic client library 102 binds the parameters of the current step of the OAuth protocol per the configuration information in the configuration file 103 for the current step of the OAuth protocol as implemented by the service 104$_N$. For example, if the configuration file 103 indicates a variable is dynamic, the generic client library 102 dynamically generates and binds the variable. At block 440, the generic client library 102 signs the request parameters based on the parameters stored in the configuration file 103 for the current step of version 1.0 of the OAuth protocol for the target service 104$_N$. At block 445, the generic client library 102 constructs an HTTP request which includes header, body, and query portions per the information for the current step of the OAuth protocol implemented by the service 104$_N$ in the configuration file 103. At block 450, the generic client library 102 makes the HTTP call according to a format (e.g., HTTP GET, HTTP POST, or HTTP PUT) specified in the configuration file 103 for the service 104$_N$. For example, the configuration file 103 for the target service 104$_N$ may indicate that the service 104$_N$ requires query parameters to be passed via the HTTP POST method. At block 455, the generic client library 102 may validate a response received from the service $104_N$ responsive to the HTTP call. The generic client library 102 validates the response based on rules for validating the response for the service $104_N$ stored in the configuration file 103. As previously indicated, the recipient of an HTTP request (e.g., the HTTP call issued at block 450) may respond with an HTTP response. Therefore, the service $104_N$ may respond to the HTTP call of block 450 with any valid HTTP response (e.g., 200 success, 500 failure, etc.). As such, the configuration file 103 may include information on how to parse each HTTP response received from each service $104_N$.

At block 460, the generic client library 102 determines whether the validated response indicates the response was successful. If the response was successful, the generic client library 102 proceeds to block 465, where the generic client library 102 parses values provided by the service $104_N$ in the response per the information corresponding to the response for the service $104_N$ in the configuration file 103. At block 470, the generic client library 102 stores the values parsed at block 465 for future use. The generic client library 102 may then proceed to block 480.

Returning to block 460, if the response was not successful (e.g., the service $104_N$ returns an HTTP 500 message indicating an error), the generic client library 102 proceeds to block 475. At block 475, the generic client library 102 parses the error based on rules for parsing the error stored in the configuration file 103 for the service $104_N$. At block 480, the generic client library 102 returns an indication of an error.

At block 485, the generic client library 102 determines whether more steps of version 1.0 of the OAuth protocol remain. If more steps remain, the generic client library 102 returns to block 405 to continue the steps of the OAuth protocol. If no more steps remain, the OAuth authorization process has completed (or was terminated based on an error), and the method 400 ends.

Figure 5:
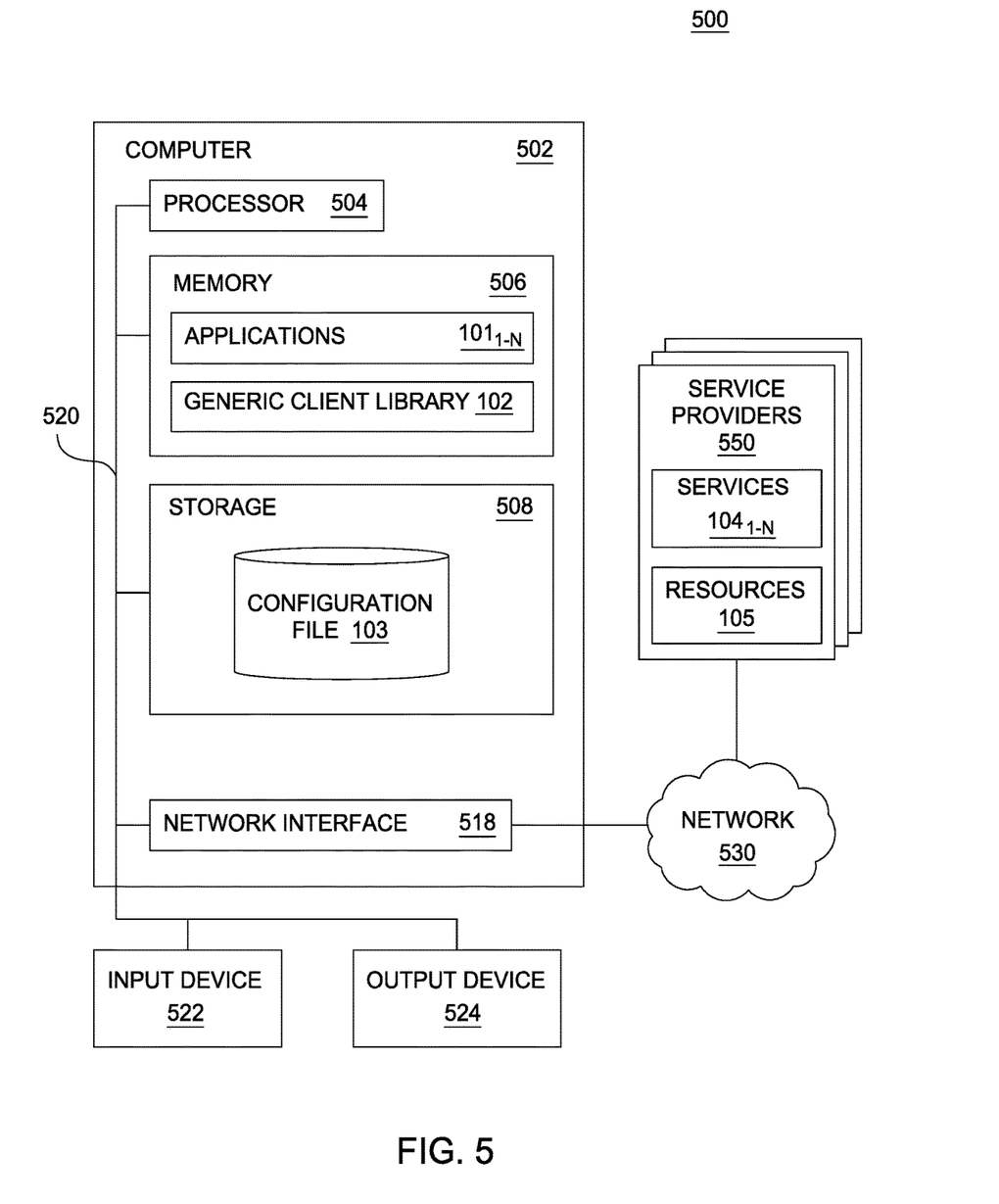
FIG. 5 illustrates an example system which provides a configuration based client for OAuth authorization with arbitrary services and applications, according to one embodiment.

FIG. 5 illustrates an example system 500 which provides a configuration based client for OAuth authorization with arbitrary services and applications, according to one embodiment. The networked system 500 includes a computer 502. The computer 502 may also be connected to other computers via a network 530. In general, the network 530 may be a telecommunications network and/or a wide area network (WAN). In a particular embodiment, the network 530 is the Internet.

The computer 502 generally includes a processor 504 which obtains instructions and data via a bus 520 from a memory 506 and/or a storage 508. The computer 502 may also include one or more network interface devices 518, input devices 522, and output devices 524 connected to the bus 520. The computer 502 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface device 518 may be any type of network communications device allowing the computer 502 to communicate with other computers via the network 530.

The storage 508 is representative of hard-disk drives, solid state drives, flash memory devices, optical media and the like. Generally, the storage 508 stores application programs and data for use by the computer 502. In addition, the memory 506 and the storage 508 may be considered to include memory physically located elsewhere; for example, on another computer coupled to the computer 502 via the bus 520.

The input device 522 may be any device for providing input to the computer 502. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the computer 502. The output device 524 may include output devices such as monitors, touch screen displays, and so on.

As shown, the memory 506 contains the applications $101_{1-N}$ and the generic client library 102. In at least one embodiment, the generic client library 102 is an integrated component of the applications $101_{1-N}$. As shown, the storage 508 contains the configuration file 103. As shown, a plurality of service providers 550 provide one or more of the services $104_{1-N}$, which in turn provide access to the resources 105 to the applications $101_{1-N}$. Generally, the system 500 is configured to implement all methods, source code, systems, and apparatuses described above.

Advantageously, embodiments disclosed herein provide techniques to efficiently scale applications to support the various implementations of the OAuth protocol by a plurality of different service providers. By abstracting the implementation details from the applications, the applications need not be aware of the specific details of each implementation. Instead, the generic client library 102 may reference the configuration file 103 to identify the implementation details for each service, and may complete the steps of the OAuth protocol on behalf of the applications $101_{1-N}$ to authorize with the services $104_{1-N}$.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the generic client library 102 could execute on a computing system in the cloud. In such a case, the generic client library 102 may reference the configuration file 103 which is stored at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for generic authentication with arbitrary services, the method comprising:
   receiving, from a first application, by a generic client library, a request to authorize with a first service, of a plurality of services, using OAuth protocol;
   identifying in a configuration file, by the generic client library, a set of parameters specific to an implementation of the OAuth protocol provided by the first service, wherein the set of parameters includes a Hypertext Transfer Protocol (HTTP) input method used by the implementation of the OAuth protocol provided by the first service;
   generating, by the generic client library, a first HTTP request based on the set of parameters specific to the implementation of the OAuth protocol provided by the first service, wherein the generated first HTTP request uses the HTTP input method specified in the set of parameters identified in the configuration file; and
   authorizing, by the generic client library, the first application with the first service via the OAuth protocol using the generated first HTTP request.

2. The method of claim 1, further comprising prior to receiving the request:
   defining, in the configuration file, a respective set of parameters for each of the plurality of services, wherein each set of parameters reflects an implementation of the OAuth protocol provided by each respective service.

3. The method of claim 1, wherein the OAuth protocol comprises a plurality of steps, wherein each parameter of the set of parameters is related to at least one of the plurality of steps of the OAuth protocol, wherein the set of parameters comprise: (i) a uniform resource locator (URL) of the first service, (ii) a set of parameters for each step of the OAuth protocol provided by the first service, (iii) at least one binding method used by the generic client library to bind a value to a first parameter, and (iv) at least one validation rule for validating a response received by the generic client library from the first service while authorizing the first application via the OAuth protocol.

4. The method of claim 1, wherein the generic client library comprises: (i) an authorize function configured to initiate the OAuth protocol with the first service, (ii) a callback function configured to request a token from the first service, and (iii) a resolve function configured to bind parameters based on the set of parameters specified in the configuration file.

5. The method of claim 4, wherein authorizing the first application comprises:
   binding, by the resolve function, at least one HTTP parameter according to the set of parameters for the first service; and
   transmitting the first HTTP request to the first service, wherein the first HTTP request includes the at least one HTTP parameter.

6. The method of claim 5, wherein authorizing the first application further comprises:
   validating, by the callback function, a response received from the first service by the generic client library, wherein the response is responsive to the first HTTP request;
   upon determining that the response is valid:
      generating a token request based on the set of parameters for the first service;
      transmitting, by the callback function, the token request to the first service; and
      receiving, by the callback function, a token from the first service; and
   upon determining that the response is an error response, generating an indication of an error based on the set of parameters for the first service.

7. The method of claim 1, wherein the set of parameters for the first service are specific to a version of the OAuth protocol of the implementation of the OAuth protocol provided by the first service, the method further comprising:
   subsequent to authorizing the first application, accessing, by the first application, at least one resource provided by the first service.

8. A computer program product, comprising: a computer-readable hardware storage device having computer readable program code embodied therewith, the computer readable program code executable by a processor to perform an operation for generic authentication with arbitrary services, the operation comprising:
   receiving, from a first applications by a generic client library, a request to authorize with a first service, of a plurality of services, using OAuth protocol;
   identifying in a configuration file, by the generic client library, a set of parameters specific to an implementation of the OAuth protocol provided by the first service, wherein the set of parameters includes a Hypertext Transfer Protocol (HTTP) input method used by the implementation of the OAuth protocol provided by the first service;

generating, by the generic client library, a first HTTP request based on the set of parameters specific to the implementation of the OAuth protocol provided by the first service, wherein the generated first HTTP request uses the HTTP input method specified in the set of parameters identified in the configuration file;

and authorizing, by the generic client library, the first application with the first service via the OAuth protocol using the generated first HTTP request.

9. The computer program product of claim 8, the operation further comprising prior to receiving the request:

defining, in the configuration file, a respective set of parameters for each of the plurality of services, wherein each set of parameters reflects an implementation of the OAuth protocol provided by each respective service.

10. The computer program product of claim 8, wherein the OAuth protocol comprises a plurality of steps, wherein each parameter of the set of parameters is related to at least one of the plurality of steps of the OAuth protocol, wherein the set of parameters comprise: (i) a uniform resource locator (URL) of the first service, (ii) a set of parameters for each step of the OAuth protocol provided by the first service, (iii) at least one binding method used by the generic client library to bind a value to a first parameter, and (iv) at least one validation rule for validating a response received by generic client library from the first service while authorizing the first application via the OAuth protocol.

11. The computer program product of claim 8, wherein the generic client library comprises: (i) an authorize function configured to initiate the OAuth protocol with the first service, (ii) a callback function configured to request a token from the first service, and (iii) a resolve function configured to bind parameters based on the set of parameters specified in the configuration file.

12. The computer program product of claim 8, wherein authorizing the first application comprises:

binding, by a resolve function, at least one HTTP parameter according to the set of parameters for the first service; and transmitting the first HTTP request to the first service, wherein the first HTTP request includes the at least one HTTP parameter.

13. The computer program product of claim 8, wherein authorizing the first application further comprises:

validating, by a callback function, a response received from the first service by the generic client library, wherein the response is responsive to the first HTTP request;

upon determining that the response is valid:

generating a token request based on the set of parameters for the first service;

transmitting, by the callback function, the token request to the first service; and receiving, by the callback function, a token from the first service; and upon determining that the response is an error response, generating an indication of an error based on the set of parameters for the first service.

14. The computer program product of claim 8, wherein the set of parameters for the first service are specific to a version of the OAuth protocol of the implementation of the OAuth protocol provided by the first service, the operation further comprising:

subsequent to authorizing the first application, accessing, by the first application, at least one resource provided by the first service.

15. A system, comprising:
a processor; and
a memory storing one or more instructions which, when executed by the processor, performs an operation for generic authentication with arbitrary services, the operation comprising:

receiving, from a first application, by a generic client library, a request to authorize with a first service, of a plurality of services, using the OAuth protocol;

identifying in a configuration file, by the generic client library, a set of parameters specific to an implementation of the OAuth protocol provided by the first service, wherein the set of parameters includes a Hypertext Transfer Protocol (HTTP) input method used by the implementation of the OAuth protocol provided by the first service;

generating, by the generic client library, a first HTTP request based on the set of parameters specific to the implementation of the OAuth protocol provided by the first service, wherein the generated first HTTP request uses the HTTP input method specified in set of parameters identified in the configuration file; and authorizing, by the generic client library, the first application with the first service via the OAuth protocol using the generated first HTTP request.

16. The system of claim 15, the operation further comprising prior to receiving the request:

defining, in the configuration file, a respective set of parameters for each of the plurality of services, wherein each set of parameters reflects an implementation of the OAuth protocol provided by each respective service.

17. The system of claim 15, wherein the OAuth protocol comprises a plurality of steps, wherein each parameter of the set of parameters is related to at least one of the plurality of steps of the OAuth protocol, wherein the set of parameters comprise: (i) a uniform resource locator (URL) of the first service, (ii) a set of parameters for each step of the OAuth protocol provided by the first service, (iii) at least one binding method used by generic client library to bind a value to a first parameter, and (iv) at least one validation rule for validating a response received by generic client library from the first service while authorizing the first application via the OAuth protocol.

18. The system of claim 15, wherein the generic client library comprises: (i) an authorize function configured to initiate the OAuth protocol with the first service, (ii) a callback function configured to request a token from the first service, and (iii) a resolve function configured to bind parameters based on the set of parameters specified in the configuration file.

19. The system of claim 15, wherein authorizing the first application comprises:

binding, by a resolve function, at least one HTTP parameter according to the set of parameters for the first service; and transmitting the first HTTP request to the first service, wherein the first HTTP request includes the at least one HTTP parameter.

20. The system of claim 19, wherein authorizing the first application further comprises:

validating, by a callback function, a response received from the first service by the generic client library, wherein the response is responsive to the first HTTP request;

upon determining that the response is valid:

generating a token request based on the set of parameters for the first service;

transmitting, by the callback function, the token request to the first service; and receiving, by the callback function, a token from the first service; and upon determining that the response is an error response, generating an indication of an error based on the set of parameters for the first service.

\* \* \* \* \*